Patented Mar. 27, 1945

2,372,476

UNITED STATES PATENT OFFICE 2,372,476

LIVESTOCK FEEDS

Wallace P. Elmslie, Quincy, Ill., assignor to Moorman Manufacturing Company, Quincy, Ill., a corporation of Illinois No Drawing. Application September 30, 1942, Serial No. 460,283

2 Claims. (Cl. 99—2)

The present invention relates to livestock feeds and particularly to protein supplements, such as soybean oil meal, linseed meal, cocoanut oil meal, tankage, and the like.

A difficulty encountered in the feeding of protein supplements is that in general they cannot be self-fed because the animals, and hogs in particular, will consume much more than is needed to balance their ration. For example, self-fed soybean oil meal is so palatable that hogs will frequently eat several pounds a day, although their actual requirements for protein are satisfied by from one-half to one pound per day in addition to their ordinary grain feed. The palatability of protein feeds has resulted in either wastage or the necessity of hand-feeding, the latter requiring both extra work and trouble.

Attempts have been made to mix soybean oil meal and the like with ground grain or ordinary mineral mixtures, but these combinations of feeds do not overcome the difficulty. The primary object of the present invention is the provision of a protein supplement livestock feed which may be economically self-fed.

It is desirable to mix minerals with protein supplements because they are generally deficient in minerals. The mineral mixture may consist generally of limestone, bone black, Curacao phosphate, lime phosphate, salt, sulphate of soda, sulphate of iron, charcoal, iron oxide, copper sulphate, manganese sulphate, magnesium oxide, petrolatum and potassium iodide, the proportion of these minerals in the mixture constituting no part of the invention. They may be mixed in conventional manner. Such a mineral mixture or a similar mixture to which has been added 5 to 15% of calcium chloride when added to soybean oil meal or other protein supplement at the rate of one part to ten will provide a protein supplement with adequate mineral constituents, and the large percentage of calcium chloride in the mineral mixture has the effect of reducing the consumption so that hogs will consume an average of approximately one-half to three-quarters of a pound per day of the protein supplement, which is within the desired and economical range. Thus, hand-feeding is done away with and the protein supplement may be self-fed.

In the foregoing description reference has been made to a mineral mixture containing from 5 to 15% of calcium chloride. While the percentage may vary considerably within this range, it appears that in most instances optimum conditions are obtained if the percentage of calcium chloride in the mixture of proteins and minerals is in the neighborhood of .7%.

The calcium chloride has the advantage not only that it reduces the consumption of the protein supplement, but it has a nutritional value in that it provides soluble calcium. Calcium deficiency is the principal deficiency in vegetable proteins, such as soybean oil meal and the like, and this available source of calcium is a very valuable mineral constituent. In addition, the calcium chloride has an advantage because of its hydroscopic properties, since it draws moisture from the air and keeps down dust in the mineral mixture and in the supplement. Likewise, due to the fact that it brings moisture into the mixture, it helps to keep the mineral from separating out of the protein supplement. This last feature is of importance because the mineral portion of such a feed is much heavier than the protein portion and would tend to stratify at the bottom of the bag, trough or feeder in which the supplement is contained.

While I have described the invention as including a rather complete mineral mixture to which the calcium chloride is added, it is obvious that the mineral mixture need not include all of the elements mentioned, but may consist of part of them or of other elements.

The invention may also be carried out by dispensing with the use of a mineral mixture entirely and only mixing calcium chloride with the protein supplement. The desired percentage of calcium chloride to be mixed directly with the protein supplement is in the neighborhood of .5% to 3%. Possibly even a little greater percentage of calcium chloride can be used when no minerals are employed in the mixture.

I claim:

1. A livestock feed mixture suitable for self-feeding, comprising a highly palatable protein supplement which is not suitable in and of itself for self-feeding, a mineral mixture, and calcium chloride in an amount sufficient to materially affect the palatability of the protein supplement in the mixture and thereby control the consumption of the mixture, the amount of said calcium chloride being in the neighborhood of .7%

2. A livestock feed mixture suitable for self-feeding, comprising a highly palatable protein supplement which is not suitable in and of itself for self-feeding, a mineral mixture, and calcium chloride in an amount sufficient to materially affect the palatability of the protein supplement in the mixture and thereby control the consumption of the mixture, the amount of said calcium chloride ranging from .5% to 3%.

W. P. ELMSLIE.